Patented Jan. 12, 1932

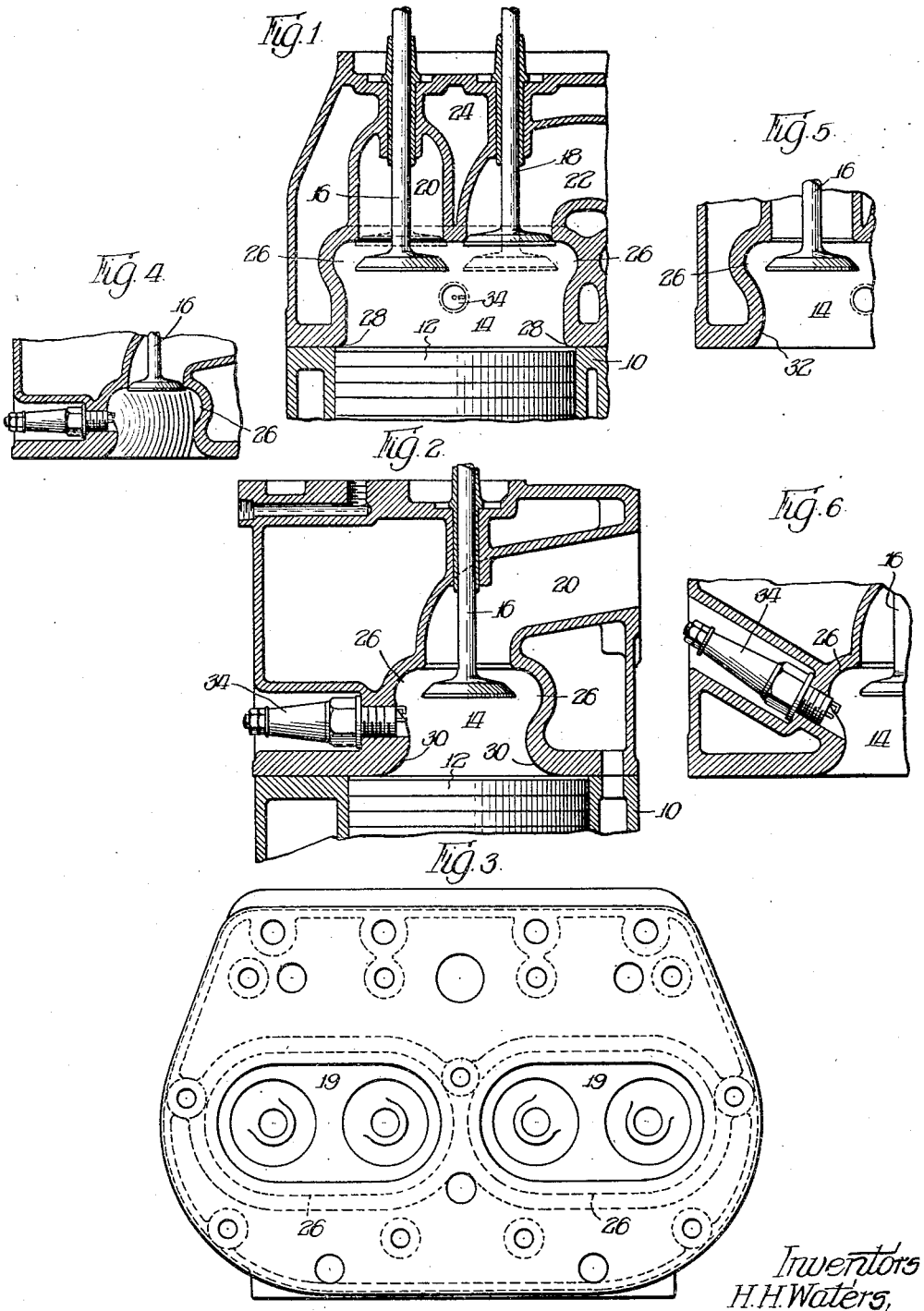

1,840,610

UNITED STATES PATENT OFFICE

ALLEN C. STALEY AND HARRY H. WATERS, OF CLINTON, IOWA, ASSIGNORS TO CLIMAX ENGINEERING COMPANY, OF CLINTON, IOWA, A CORPORATION OF DELAWARE

COMBUSTION CHAMBER

Application filed March 8, 1929. Serial No. 345,474.

This invention relates to internal combustion engines and the like and is illustrated herein as embodied in a combustion chamber in which the explosive charge is mixed and ignited prior to entering the cylinders of the engine.

Combustion chambers located atop the cylinders of internal combustion engines are old and well known in the art and innumerable designs and shapes of chambers have heretofore been patented. In most instances, the combustion chambers have been restricted in their application to engines having upright poppet valves, or valves provided with horizontally arranged stems and vertically extending heads arranged to control fluid openings in the side wall of the chamber. An example of the former type is to be found in United States Letters Patent No. 1,474,003, granted November 13, 1923, to one Ricardo, and of the latter in No. 1,244,481, granted October 30, 1917, to Duesenberg et al. The numerous endeavors that have been made in the aforementioned fields have been attended upon occasion with some degree of success, but there remains a broad field of internal combustion engines that has never been provided with a successful or even satisfactory combustion chamber, this being the class of engines embodying overhead valves, or valves located vertically in the top of the combustion space.

It is of course true that any number of patents have been granted directed to the manner of arranging or controlling overhead valves in the top of a cylinder, but the disclosures of such patents are not to be confused with the present invention which is directed not to the cylinders or to the arrangement of valves therein but to the provision of a combustion chamber associated with a cylinder and to the arrangement of valves in the chamber.

A combustion chamber generally embodies certain definite characteristics; it is located atop the cylinder, is of considerably less volume than the latter, and is of a different or non-analogous shape or configuration. In the application of these principles of design to over head valve engines a rather fundamental difficulty is encountered; it is usually desirable in such engines to have the inlet and exhaust valves as large as possible: so large in fact that if inserted in a cylinder not provided with a combustion chamber, they extend almost completely across the cylinder, in much the same manner that two half dollars placed on an inverted glass will extend thereacross. The necessity of providing large valves is inconsistent with that of mounting them in the top of a small combustion chamber and herein has formerly resided the difficulty of providing a suitable combustion chamber for overhead valve engines. In an effort to overcome the difficulty the chambers have been made as large as the cylinders and separated therefrom by a perforated plate or an inwardly projecting flange, or the valves have been mounted one in the top wall and one in the side wall of the chamber, or as a last resort the valves have been crowded in the top of the chamber with the result that the passage of the incoming and exhausting gases has been impeded and obstructed with harmful results.

In view of the foregoing desideratum the present invention has for an object thereof the provision of a novel combustion chamber suitable for use in connection with internal combustion engines having over head valves located in the top of the combustion space.

An important features of the invention which is conducive to the accomplishment of the recited object consists in the provision of a combustion chamber of comparatively small dimensions having its walls shaped to provide clearance for incoming and exhausting gases. By means of such a provision, valves of the desired size may be mounted in close relationship in the top of the chamber yet the flow of the gases will not be impeded or obstructed in anywise owing to the presence of the clearance space surrounding the valves. In the illustrated embodiment of the invention, the clearance is procured by providing the walls of the combustion chamber with a recess at points adjacent to the valves whereby the valves when open are surrounded by an annular space of adequate proportions to allow for the easy flow of gases.

Furthermore the gases in entering the chamber at a high velocity strike the walls of the annular recess and are diverted thereby creating a high turbulance which brings about a thorough commingling of the gas particles, insures a rapid spread of the flame, and tends to prevent the isolation and subsequent detonation of a portion of the charge.

The matter of preventing detonation, (in this connection detonation may be considered an explosion of the first order involving a very rapid change accompanied by a shattering effect as distinguished from an explosion of the second order, where the change of state is relatively slower and is accompanied by a propelling or pushing effect) is of paramount importance in combustion chambers, and it is accordingly a further object of the present invention to provide a combustion chamber of the character described that is constructed in such a manner that detonation is substantially reduced or eliminated entirely.

In carrying out this object of the invention two features have been combined either of which is of extreme importance, and both of which cooperate to produce highly beneficial and efficient results. First, the means in the combustion chamber for igniting the gases is so located that the flame travel to all parts of the combustion chamber is substantially as short as possible, and Second, the burning is such that the last gases to be burned are kept cool, by remaining in contact with a cooled surface, until combustion takes place in a normal and orderly fashion.

By shortening the flame travel to all parts of the chamber a simultaneous and instantaneous ignition at all points within the chamber is promoted, and consequently there is a tendency for all burning to be normal and the change of state of the charge to be relatively slow and accompanied by a propelling or pushing effect, whereby the tendency to detonate is reduced.

On the other hand, if the gases in the chamber can be so burned that the last gases to be burned are cooled at the time of their ignition, through being in contact with a cooled surface, or in any other manner, the combustion will take place in a normal fashion and the conditions are the best possible to prevent detonation. In view of this fact, it is desirable not to have the ignition means, generally a spark plug, located too far away from the exhaust valve as the final gases in the process of combustion would tend to be in contact with the hot exhaust valve and detonation would ensue. Similarly, locating the ignition means at such a point that the course of combustion would be directed toward the piston would likewise tend to cause detonation for the final gases in the path of combustion would be in contact with the hot piston. It has been found that locating the intake and exhaust valves in the top of the chamber and the ignition means in the side wall of the chamber about midway of the height thereof that the combustion takes place transversely of the chamber in a direction parallel to the exposed face of the exhaust valve and piston with the result that the final gases to be burned are located across the chamber from the spark plug in contact with a water cooled wall.

The reason it is necessary to maintain the unburned gases at as relatively low a temperature as possible is because these gases are being compressed and heated by the ignited and burning portion of the charge with the result that the increase in temperature and compression of the unburned portion tends to cause spontaneous ignition resulting in a violent explosion which, of course, is detonation. But by starting the combustion at the spark plug point, igniting particle after particle of gas in such a manner that the last particle is never raised to a self-igniting temperature, but must be ignited by contact with the burning portion of the gas the tendency to detonate is reduced to a minimum and a high degree of efficiency is obtained.

Other objects and features of the invention will become apparent from a reading of the following specification in the light of the accompanying drawings, in which—

Figure 1 is a view of the top of a cylinder in section showing a combustion chamber of the invented design;

Figure 2 is a view in side elevation in section of the parts shown in Figure 1;

Figure 3 is a bottom plan view of the parts located above the piston;

Figure 4 is a diagrammatic view similar to the side elevational view of Figure 2;

Figure 5 is a fragmentary view showing a somewhat modified form of construction; and Figure 6 is another fragmentary view showing another modification.

As shown in the drawings, the reference numeral 10 indicates a cylinder wall of the ordinary water cooled variety having a piston 12 mounted therein, the piston being illustrated in Figures 1 and 2 at the top of its stroke.

Surmounting the cylinder is a combustion chamber, indicated generally by the reference numeral 14, having a plurality of valves 16 and 18 mounted in the ceiling 19 (Figure 3) for controlling the passage of gas through inlet and exhaust passageways 20, 22; the chamber and the passageways being cooled by means of water circulated through the space 24.

It has already been pointed out that a notable difficulty in constructing combustion chambers suitable for use in connection with overhead valve engines has been that either the combustion chamber must be made larger than the cylinder in order to accommodate valves of the proper size, or the valves must be made unduly small and crowded into the upper part of the combustion chamber in such a manner that the flow of gases past the valves is impeded and obstructed. The present invention aims to overcome this prior difficulty by providing an annular recess 26 extending completely around the combustion chamber at the line of junction between the vertical side and end walls of the chamber and the ceiling thereof. By reason of providing the annular groove or recess 26 at the point described the horizontal cross-sectional area of the combustion chamber throughout space occupied by the valves in opening and closing is considerably greater than that of the remaining part of the chamber, which permits the valves to be of a desired size and affords clearance for the passage of gases past the valves when the latter occupy an open position. Thus, the valves when open are located approximately centrally of this increased area and the gases are free to flow between the valve and the walls of the recess and thence into the combustion chamber and cylinder.

It will be seen that by reason of the circuitous path followed by the gas in entering the combustion chamber a high degree of turbulence is obtained by means of which the minute particles of the gas are thoroughly commingled and mixed insuring a more proper burning of the gaseous admixture and tending to prevent detonation due to an improper mixing of the particles.

As indicated in Figure 3, the combustion chamber is elliptical or oval in horizontal cross-section, the reason for this being that such a shape approximates the outline formed by the two overhead valves disposed side by side. Thus, such a chamber allows valves of as large a size as possible to be used which advantage is enhanced through the provision of the annular recess. Another distinct advantage that is obtained through the provision of the recess is that it allows the valves to be placed sufficiently far apart from one another to permit all parts of the ceiling and walls of the combustion chamber to be adequately and properly cooled.

At the line of junction between the vertical walls of the combustion chamber and the side walls of the cylinder, the former walls are rounded or curved in order that they will not interfere with or obstruct the flow of the gases from the combustion chamber into the cylinder, and as illustrated herein the vertical end walls are provided with the rounded lower edges 28, 28 and the side walls which are separated from one another by a considerably less distance than the end walls are provided with correspondingly greater rounded lower edges 30, 30. In fact, the vertical side walls of the combustion chamber illustrated in Figures 1 and 2 are substantially ogee-shaped in vertical section and it is likewise possible, as shown in Figure 5, to increase the radius of rounding curvature of the end walls as indicated by the reference numeral 32 until the end walls also approximate an ogee curve.

From so much of the description as has already been given, it will be seen that the combustion chamber permits the use of large size valves, allows them to be properly cooled, causes turbulence to be imparted to the incoming gases and does not impair the flow of gases from the combustion chamber into the cylinder. This being understood, attention will next be directed to the manner in which the gaseous admixture is ignited and burned within the combustion chamber.

As illustrated in Figures 1 and 2 the side wall of the chamber at a point midway between the intake and exhaust valves and approximately midway of the height of the chamber is provided with a spark plug 34 for ignition purposes. As illustrated in Figure 2, the plug is disposed horizontally in such a fashion that the portion of the cylinder head disposed directly beneath the plug is not completely water cooled, and owing to the fact that the portion so disposed may become too hot, there is shown in Figure 6 a modified design in which the plug 34 slopes downwardly into the combustion chamber entering the latter at the same point as the horizontal plug enters, but permits the space beneath the plug to be cooled, as illustrated.

There are two distinct advantages which are obtained by locating the spark plug in the aforedescribed position: First, the flame length from the plug to all parts of the combustion chamber is substantially as short as possible and as near uniformity as can be procured, whereby an instantaneous and thorough ignition of the gases is promoted and the tendency to detonate is reduced. Second, in order still further to reduce detonation and possibly to eliminate it the plug is so located that, as shown in Figure 4, the gases nearest the plug are first and more thoroughly ignited, with the result that the path followed by the combustion of the gases is horizontally across the combustion chamber in a direction toward the opposite sidewall which of course is constantly water cooled. Thus, the last gases to ignite are in contact with a water cooled wall which prevents the temperature of such gases from being raised to a self igniting point and allows the burning action to proceed in an orderly manner from the spark plug to the opposite side wall, whereby thorough ignition is procured and detonation is substantially eliminated, all of which is brought out in the statement of invention. Thus, the ignition means is so located that the path of combustion is not in the direction of a comparatvely hot part of the assemblage such for example as the exhaust valve or the piston, but is in a direction parallel to the exposed faces of the hot members and towards a relatively cool surface.

It is to be clearly understood that modifications in design and construction may be made in the illustrated embodiment of the invention, improvements may be brought about, and other alterations may be introduced by the exercise of mechanical skill without departing from the scope of the invention as outlined in the appended claims, and it is also to be understood that in many aspects the invention is not restricted in its application to combustion chambers provided with a plurality of overhead valves in the ceiling thereof, but may be used in connection with combustion chambers of other and different designs embodying a varied arrangement of valves and it is pointed out that the invention in some respects may be employed in connection with combustion chambers having upright poppet valves or horizontally arranged valves, without constituting an unwarranted departure from the invention as outlined in the claims.

Having thus described our invention, what we claim as new and desire to secure by United States Letters Patent, is:

1. An internal combustion engine having, in combination, a cylinder, a combustion chamber located atop the cylinder, said combustion chamber comprising a ceiling and a plurality of vertically arranged walls, and a plurality of overhead valves located side by side in the ceiling of the combustion chamber, the portion of the vertical walls disposed adjacent to the valves being recessed to afford clearance space for gases flowing past the valves.

2. A combustion chamber comprising, in combination, a ceiling the shape of which corresponds approximately to an ellipse, side and end walls extending downwardly from the ceiling, the side walls being disposed substantially vertically, and a plurality of overhead valves mounted within the ceiling, the diameter of said valves being nearly as great as the width of the ceiling, and the side walls of the chamber lying adjacent to the valves being recessed to afford clearance for gases flowing past the valves.

3. A combustion chamber comprising, in combination, a ceiling having a peripheral contour approximating an ellipse, side and end walls extending downwardly from the ceiling, the side walls being approximately ogee-shaped in vertical cross-section, and the end walls having an upper portion the shape of which coincides with the shape of the upper portion of the side walls, and a lower portion approximately straight vertically.

4. An internal combustion engine having, in combination, a cylinder, a combustion chamber with a ceiling set atop of said cylinder, a plurality of overhead valves arranged to control openings in said ceiling and a plurality of vertically arranged walls extending downwardly from said ceiling, the horizontal cross section of said chamber being elliptical in shape and having lesser area than said cylinder cross section, with a larger horizontal cross section adjacent to the top than throughout the balance bottom of said chamber.

5. An internal combustion engine having, in combination, a cylinder, a combustion chamber having an elliptical horizontal cross section set atop of said cylinder, valves in the top of said chamber, the horizontal cross section of the chamber adjacent to said valves being of greater area than other horizontal cross sections, and a spark plug located in one side of said chamber.

6. An internal combustion engine comprising, in combination, a cylinder, a piston located within the cylinder, a combustion chamber located at the top of the cylinder and being of less horizontal cross-sectional area than the cylinder, intake and exhaust valves located in the top of the chamber and ignition means located in the side wall of the chamber in such a position that combustion takes place mainly in the direction of a water-cooled surface.

7. An internal combustion engine comprising, in combination, a cylinder, a piston located within the cylinder, a combustion chamber located at the top of the cylinder and being of less horizontal cross-sectional area than the cylinder, an exhaust valve positioned within the combustion chamber, means for admitting unburned gases to the chamber and means for igniting the unburned gases, the igniting means being so positioned that the igniting and burning of the gases takes place mainly in the direction of a water-cooled portion of the chamber as contrasted with taking place in the direction of the hot piston or exhaust valve.

8. An internal combusion engine having, in combination, a cylinder, a combustion chamber surmounting said cylinder, a ceiling formed in the top of said combustion chamber, a plurality of overhead valves arranged to control openings in said ceiling, a plurality of side walls extending downwardly from said ceiling, said combustion chamber having cross sections of varying area substantially elliptical in shape and being so constructed and arranged that the cross sectional area adjacent to the valves is greater than the cross sectional area at a point lower down, and an ignition means located at a point of lesser cross sectional area, said chamber being provided with outwardly curving side walls connecting with the cylinder barrel.

9. An internal combustion engine having, in combination, a combustion chamber of substantially elliptical shape in horizontal cross section, a plurality of valves disposed in the ceiling of the chamber, an ignition means disposed in a side wall of the chamber, and a water jacket surrounding said chamber, the side and end walls of the chamber being curved to afford variable cross sectional areas, said ignition means being located at the point of substantially minimum cross sectional area.

10. A water-cooled combustion chamber comprising, in combination, a ceiling having a peripheral contour approximating an ellipse, curved side and end walls extending downwardly from said ceiling to provide horizontal cross sections of varying areas, a plurality of valves disposed within the ceiling and an ignition means in a side wall of the chamber, the horizontal cross sectional area of the chamber being greater at a point adjacent to the valves than at a point adjacent to the ignition means.

11. An internal combustion engine comprising, in combination, a cylinder, a combustion chamber surmounted upon the cylinder, a plurality of valves disposed within the ceiling of the combustion chamber, said chamber being of substantially elliptical shape in all horizontal cross sections and of lesser area than the engine cylinder and provided with a reduced cross sectional area located at approximately the vertical mid-section of the combustion chamber, and an ignition means located at the point of reduced cross sectional area.

Signed at Clinton, Iowa, this 5th day of March, 1929.

ALLEN C. STALEY.
HARRY H. WATERS.